(No Model.)

W. A. MILLER.
CIRCULAR SAW.

No. 437,128. Patented Sept. 23, 1890.

WITNESSES:
W. R. Davis,
E. M. Clark

INVENTOR:
W. A. Miller
BY Munn & Co.
ATTORNEYS

UNITED STATES PATENT OFFICE.

WILLIAM A. MILLER, OF WAPINITIA, OREGON.

CIRCULAR SAW.

SPECIFICATION forming part of Letters Patent No. 437,128, dated September 23, 1890.

Application filed February 6, 1890. Serial No. 339,395. (No model.)

*To all whom it may concern:*

Be it known that I, WILLIAM A. MILLER, of Wapinitia, in the county of Wasco and State of Oregon, have invented a new and useful Improvement in Circular Saws, of which the following is a full, clear, and exact description.

My invention relates to the construction of the teeth of circular saws, and has for its object to produce a saw which will cut freely in different qualities of wood, either to cross-cut or rip the same.

My invention further comprehends the construction of circular-saw teeth in a manner to obviate the necessity of bending the teeth laterally to give them a clearing "set," and, further, to permit them to be sharpened and furnished with cutting-edges by the use of a swaging-tool and grinding-wheel in place of filing the teeth, as is usual.

To these ends my invention consists in the peculiar construction of the saw-teeth, as will be hereinafter described, and indicated in the claims.

Reference is to be had to the accompanying drawings, forming a part of this specification, in which similar letters of reference indicate corresponding parts in all of the figures.

Figure 1:
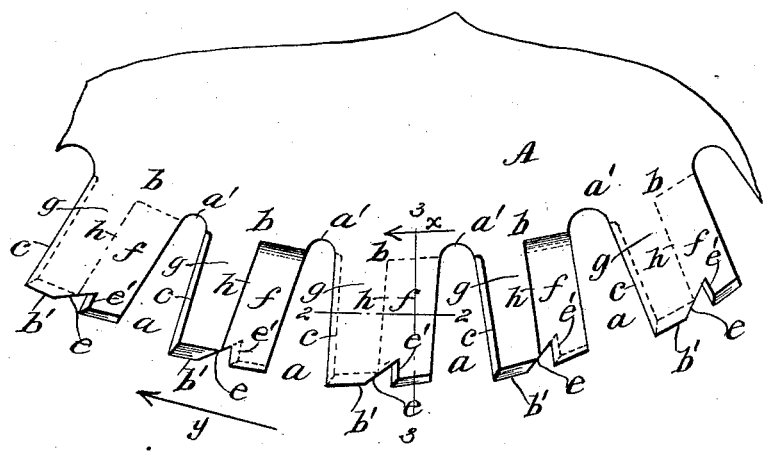
Figure 2:
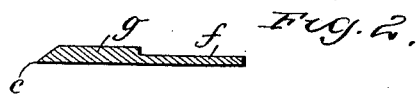
Figure 3:
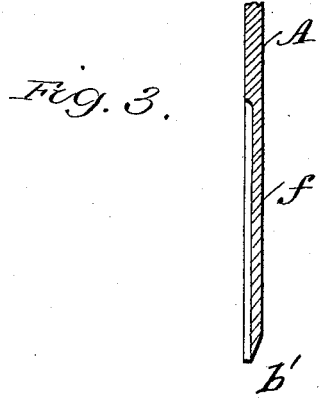

Figure 1 is a side elevation of a portion of a saw-blade provided with the improved form of teeth. Fig. 2 is a transverse section of the saw embracing one tooth-section, taken on the line 2 2 in Fig. 1; and Fig. 3 is a cross-section of one tooth-section of the saw, taken on the radial line 3 3 in Fig. 1, viewed in the direction indicated by the arrow $x$.

A is a portion of a circular-saw plate or body. On its peripheral edge at spaced intervals a series of notches $a$ is formed, said notches being of suitable depth to afford teeth of proper length considered radially. The notches $a$ are of gradually-diminishing width from the periphery of the saw to their inner terminals $a'$, which produces tooth blanks or sections $b$ between the notches of equal width, their edges, which are the side boundaries of the notches, being made substantially parallel on each tooth-section. The leading radial edges $c$ of the tooth-sections $b$ are beveled to sharpen them oppositely on each successive tooth-section, whereby they are adapted to cut the fibers of wood on opposite sides of a kerf and afford freedom for the saw when it is in operation. Each tooth-section $b$ is notched on its peripheral edge $b'$, a sloping side $e$ of said notch extending from the outer edge downwardly and rearwardly to intersect a radial side $e'$ thereof, which latter forms the leading-edge of a supplementary or auxiliary tooth $f$ thus produced on each tooth-section, a main tooth $g$ being likewise formed, of which $c$ is the cutting-edge. The radial edges $e'$ of the auxiliary teeth $f$ are beveled opposite to the front edge $c$ of each tooth-section $b$, and consequently said cutting-edges $e'$ are sloped from opposite sides on each successive tooth-section considered in the direction of travel. The tooth-sections $b$ are cut away on opposite sides alternately from a point $h$ at about their center of width rearward or away from the leading radial cutting-edges $c$, so as to reduce the bodies of the auxiliary teeth $f$ to about one-half the thickness of the main teeth $g$. The peripheral edges of the main teeth $g$ are alternately beveled from opposite sides of the same to sharpen them, whereby these main teeth are adapted to cut chips from the bottom of the saw-kerf in opposite directions, the lateral thrust or strain of chipping action being thus counterbalanced in the series of teeth comprising the saw, which will cause it to cut freely without binding in the kerf. Each auxiliary tooth $f$ is beveled on its terminal edge, which edges are coincident with the circumferential edges of the main teeth $g$, and on each tooth-section are beveled in an opposite direction from that given from the integral main tooth thereon.

From the disposition of the main teeth $g$ and auxiliary teeth $f$ on the circular-saw body A the latter-named teeth will coact with the chipping-edges of the main teeth and remove the material from the middle of the kerf, thereby lightening the work to be effected by the succeeding main teeth. The side cutting-edges of the auxiliary teeth assisting to sever the fiber of tough wood perfects the action of said teeth $f$, whether the saw be used as a cross-cut or ripping saw.

As the teeth are constructed, but a slight lateral projection of the same at their points beyond the general plane of the side surfaces of the saw-body is required to give freedom to the saw in action. This set can be provided by the use of a properly-shaped swaging-tool applied in the usual manner to upset each main-tooth body on its peripheral edge, the slight thickening thus produced affording all the clearance required.

After the main teeth are swaged they are preferably sharpened by the application of a stone or emery-wheel to their bevel edges, both radial and peripheral, whereby they are given keen cutting faces or edges that will penetrate the wood at the bottom of the kerf, shave clean the sides of the same, and in conjunction with the auxiliary teeth rapidly chip away the material and remove it with comparatively little frictional resistance.

Slight changes might be made in the shape of the main teeth of this saw and the proportions of the auxiliary teeth without departure from the spirit or exceeding the manifest scope of my invention—as, for example, the notches in the tooth-sections $b$, which divide the same into main or auxiliary teeth, as shown, have a sloping side $e$. This may be altered so as to cut the notches and provide them with parallel radial sides forming a bottom at right angles thereto and attain good results. It is preferred, however, to notch the sections $b$, as shown, from the fact that the sloping walls or sides $e$ brace the cutting-edges $c$ in a more stable manner.

The width of the portion that is reduced in thickness on each tooth-section $b$ may be slightly varied, as it is not imperative that the shoulders at $h$ on said sections should exactly represent their centers of width, although it is desirable that the auxiliary teeth $f$ should be of nearly equal size as compared to the main teeth $g$.

When swaging the peripheral edge of the main tooth $g$, the material near its cutting-point will be forced forward in the direction of the radial edge $c$ to a sufficient extent to keep said point about in line with said edge. To this end the auxiliary teeth should also be swaged to a sufficient extent to take up the wear of their radial edges and to keep their extreme points about in line with said edges. The peculiar construction of the teeth facilitates this action of the swage when properly manipulated. The end sought is to preserve the bodies of the teeth as much as may be practicable, and for this purpose, if swaged and sharpened frequently, the radial edges near the points might be made to jut forward very slightly each time they were sharpened, so as to provide beforehand for a part of the wear that must necessarily take place between the sharpenings, and thereby always keep the edges at and near the points nearly in line with the main edges. These frequent sharpenings might also prove to be economical by saving power, by improving the quality of the product, and by increasing the amount of work accomplished.

The rigid nature of the teeth to the rearward of their points makes it feasible to use a swaging-tool on the outward extremities of their radial edges in case of necessity, and if the tool is properly constructed it will be beneficial to so use it to a limited extent; but the best results can be attained by doing most of the swaging on the peripheral edges, as already indicated.

The shoulder $h$ might be inclined a little to the rearward as it approaches the main body of the saw if it were desirable to make comparatively narrow sections, so as to provide a greater number of teeth in a given space. This would strengthen each section toward its base.

The notches in the extremities of the tooth-sections $b$ need not always be made in the relative proportions shown in the drawings as compared with the teeth, but it is essential that they should always be kept of sufficient size to admit of the free use of a swaging-tool and grinding-wheel, as described, if the saw is to be kept in order by this process, as has been contemplated.

Having thus described my invention, I claim as new and desire to secure by Letters Patent—

1. A circular saw having a series of tooth-sections, each composed of a main radial tooth and an auxiliary tooth of less thickness than the main tooth, substantially as set forth.

2. A circular saw having its tooth-sections provided with auxiliary teeth integral with its main teeth on each section and adapted to cut chips of less width than the main teeth, substantially as set forth.

3. A circular saw having a series of radial tooth-sections, each composed of a thick leading main tooth and an integral thinner auxiliary tooth, the auxiliary teeth being formed by notching the peripheral edges of the tooth-sections and removing material from opposite sides of alternate auxiliary teeth, substantially as set forth.

4. A circular saw having a series of radiating tooth-sections, each composed of a main tooth and an auxiliary tooth of less thickness than the main tooth, said main teeth being provided with leading radial cutting-edges and peripheral cutting-edges alternately beveled from the opposite side of each tooth, substantially as set forth.

5. A circular saw having a series of radiating tooth-sections, each composed of a main leading tooth and an integral thinner auxiliary tooth formed by notching the peripheral edges of the tooth-sections and removing material from opposite sides on alternate auxiliary teeth, leading cutting-edges on the main teeth oppositely beveled on alternate teeth, penetrating and chipping bevel edges on the periphery of each main tooth inclined oppositely on each successive tooth, and bevel cutting-edges produced on the radial and peripheral edges of each auxiliary tooth, which are sloped from a side opposite to the bevel of the radial and peripheral edge on an integral main tooth, substantially as set forth.

WILLIAM A. MILLER.

Witnesses:
SILAS W. DAVIS,
WILLIAM H. DAVIS.